Feb. 3, 1953   J. RAZEK   2,627,372
AVERAGING DEVICE
Filed March 24, 1944   2 SHEETS—SHEET 1

INVENTOR
Joseph Razek

Feb. 3, 1953        J. RAZEK        2,627,372
AVERAGING DEVICE

Filed March 24, 1944        2 SHEETS—SHEET 2

WITNESS:
Rob't P. Kitchel.

INVENTOR
Joseph Razek
BY
Bussen Harding
ATTORNEYS.

Patented Feb. 3, 1953

2,627,372

UNITED STATES PATENT OFFICE 2,627,372

AVERAGING DEVICE

Joseph Razek, Llanerch, Pa., assignor, by mesne assignments, to Cochrane Corporation, a corporation of Pennsylvania Application March 24, 1944, Serial No. 527,886

7 Claims. (Cl. 235—61)

The present invention relates to an averaging device, that is, a device for automatically indicating the average value of a quantity over a period of time.

In many technological operations it is desirable to obtain the average value of some quantity, which is either varying with time or which is, or should be, approximately constant with time, over some interval. As an example of this, reference might be made to the taking of astronomical observations when the observer is on a moving platform having possible irregular motions such as would occur if the observations were made from an airplane in flight or a small boat. Under such circumstances, and as will be made clear hereafter, a good value for the observation may be obtained if the observer attempts continuously throughout a short period of time to maintain the heavenly body on the horizon of a sextant.

The invention, however, is not limited to the making of observations where a human element is involved. It is also applicable to the securing of more reliable indications where some automatic instrument is used but where either the instrument itself does not have an instantaneous response or is subject to some disturbances or where the quantity measured is subject to fluctuations but its average value at a particular time is desired.

The broad object of the present invention relates to the provision of a device for use in cases of the type indicated to indicate what might be regarded as a good average value of some measurable quantity. The broad object of the invention and more specific objects, particularly relating to details of apparatus, will become apparent from the following description read in conjunction with the accompanying drawings, in which:

Figure 1A is a section taken on the plane indicated at 1A—1A in Figure 1.

Figure 2:
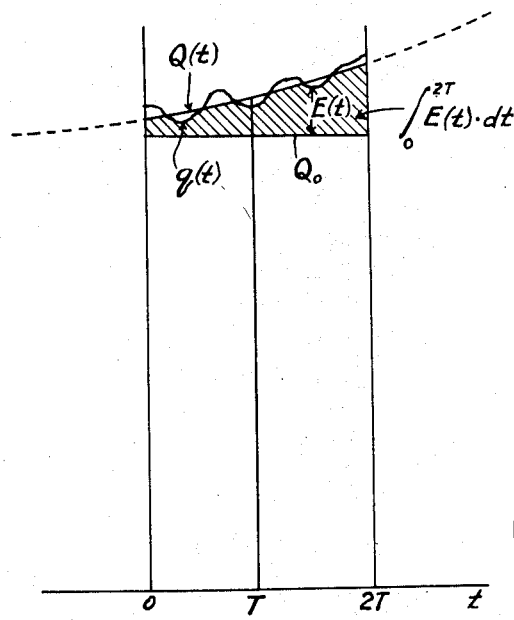
Figure 2 is a graph illustrative of the theoretical matters involved.

The following discussion will indicate the principles involved in the invention:

Suppose a quantity $Q(t)$ varies with time and it is desired to ascertain its value at some time falling within a particular period of observation. The smooth curve in Figure 2 shows such a quantity.

Assume, now, that an observer attempts to measure Q continuously throughout an interval from $t=0$ to $t=2T$, but is prevented by some disturbance from doing better than continuously approximating Q in the measurements. A good example would be that of measuring the altitude of the sun from a small boat or aircraft. The observer could attempt to keep the sun on the horizon of the sextant but would in fact undershoot and overshoot the correct position so that the observations, if continuously plotted against time, would be represented by some such irregular line as $q(t)$ passing above and below Q.

Nevertheless, assuming some fair balance of positive and negative errors and not too great curvature of Q, a good average value for Q at $t=T$ would be:

(1) $$Q(T)=\frac{1}{2T}\int_0^{2T} q(t)\cdot dt$$

If before starting the observations a fair guess as to the value of Q(T) could be made, e. g., $Q_0$, $q(t)$ can be expressed as $Q_0$ plus some instantaneous departure, $E(t)$, of $q(t)$ from $Q_0$, i. e.:

(2) $$q(t)=Q_0+E(t)$$

Substituting in (1):

(3) $$Q(T)=\frac{1}{2T}\int_0^{2T}(Q_0\cdot dt+E(t)\cdot dt)$$
$$=Q_0+\frac{1}{2T}\int_0^{2T} E(t)\cdot dt$$

It will be evident that the integrand is much smaller in (3) than in (1) which, as will appear later, reduces the necessary scale of the integrating apparatus.

The present invention is concerned with the evaluation of the integral in (3).

Suppose two electrical or mechanical systems, one of which is vibrating at a constant frequency F while the other is vibrating at each instant at a frequency $F+KE(t)$, K being a constant. If the two systems run simultaneously and similar mechanisms are provided for each to count the cycles by providing a displacement proportional to the cycles, two displacements $S_1$ and $S_2$ will result as follows:

(4) $$S_1=C\int_0^{2T} F\cdot dt=2CTF$$

(5) $$S_2=C\int_0^{2T}\{F+K\cdot E(t)\}dt=2CTF+CK\int_0^{2T} E(t)\cdot dt$$

(As examples, the mechanisms may be similar clocks, the balance wheel of one having its frequency subject to change by $E(t)$ as indicated, in which case the hands would have the respective displacements; or, if the frequencies of two electrical currents are involved, the displacements would be those of the shafts of synchronous motors driven by the currents.)

The ratio $$R = \frac{S_2}{S_1}$$

will then be:

(6) $$R = 1 + \frac{K}{F}\left(\frac{\int_0^{2T} E(t) \cdot dt}{2T}\right)$$

The last term in parentheses will be seen to be the correction term to be added to $Q_0$ to give the desired average value $Q(T)$. Accordingly, a mechanism which will indicate the ratio $R$ of $S_2$ to $S_1$ may have its scale calibrated in terms of the correction term, $$\frac{K}{F}$$

being merely a scale constant of the apparatus.

Figure 1:
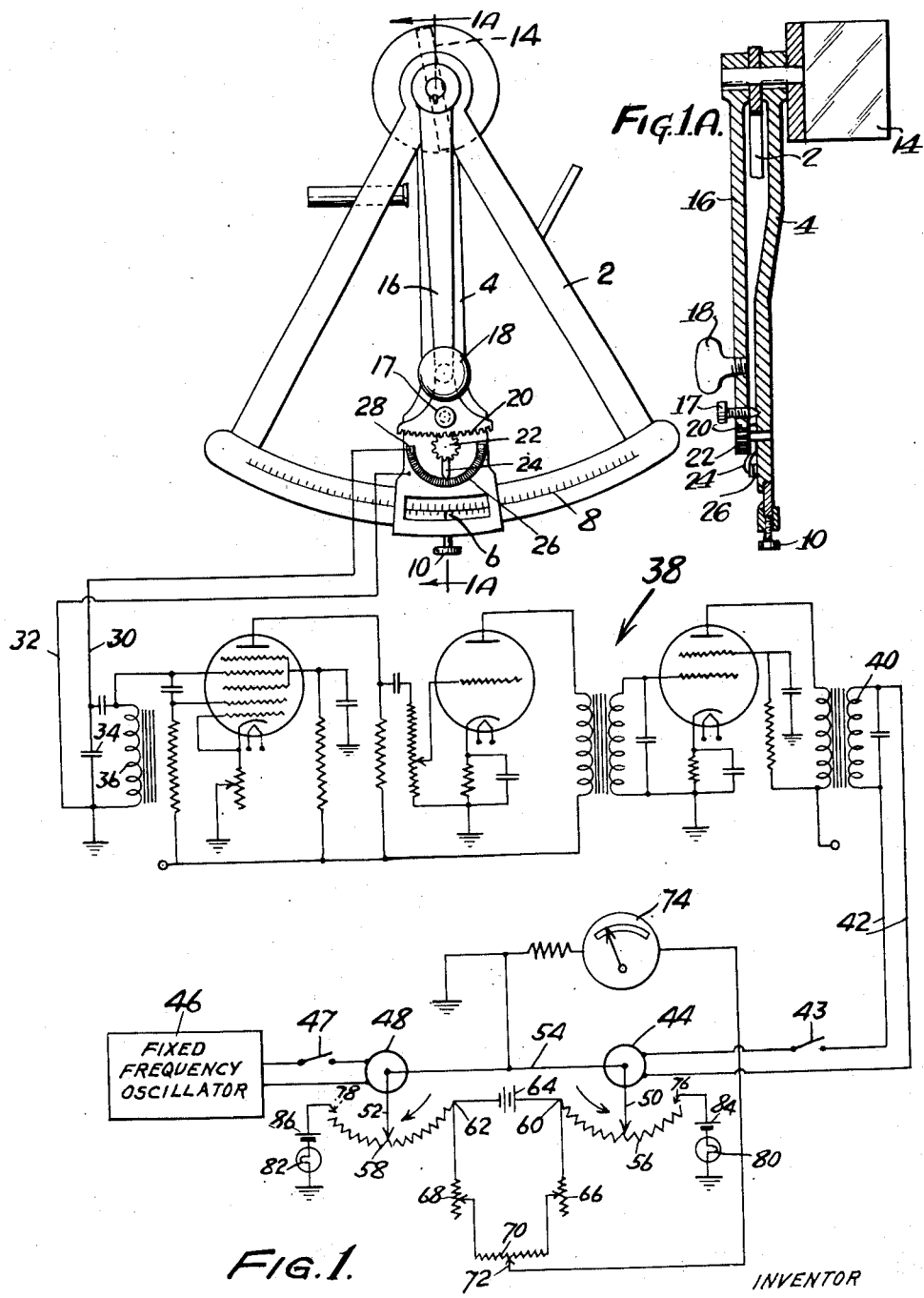
Figure 1 is a diagram illustrating in detail a complete apparatus applied to a sextant for the making of astronomical observations.

The application of the foregoing principles to a practical situation is illustrated in Figure 1.

A sextant 2 carries an index arm 4 provided with an index 6 movable along a graduated arc 8. Clamping means, conventionalized as a screw 10, are arranged to hold the arm 4 in fixed position along the arc. In the conventional sextant a mirror 14 is secured to an arm such as 4. In the present instance, however, the mirror 14 is not carried by the arm 4 but, instead, is carried by an auxiliary arm 16 pivoted concentrically with the arm 4 but adapted to be moved relatively thereto by a knob or other means indicated at 18. A clamping screw or other device 17 may be used to clamp the two arms 4 and 16 together. The arm 16 carries a gear segment 20 which meshes with a pinion 22 journalled in the arm 4, which pinion carries a contact arm 24 which engages an accurately made resistor 26 as indicated.

One end 28 of the resistor 26, which is insulated from the arm 4, is connected through the line 30 to the ungrounded side of a condenser 34, while the arm 4, connected electrically to the contact member 24, is connected through the line 32 to the grounded side of the condenser. The condenser 34 is shunted across a reactor 36 to form a combination of elements capable of controlling the frequency of a so-called negative resistance oscillator indicated at 38.

The oscillator 38 is of well-known type and need not be particularly described, being, in fact, merely illustrative of a group of conventional oscillators capable of application to the invention. The oscillator characteristic which is desired is that it should have a frequency variable in accordance with the change of a single resistance which, in the present case, is the resistance existing at 26 between the contact 24 and the terminal 28. Oscillators of the type illustrated are very stable and the change in frequency can be made very precisely proportional to the value of the resistance just mentioned when the various components of the oscillator are properly designed in accordance with well-known practice. The net result of the system so far described, therefore, is the delivery through the last amplifying tube of an alternating current, the frequency of which is linearly related to the value of the resistance inserted in the circuit at 26.

The output of the oscillator is fed through the transformer 40 and the lines 42 controlled by a switch 43 to a small synchronous motor 44 of the type commonly used in electric clocks, this motor being of the self-starting type and capable of substantially instantaneous reaching of its synchronous speed. Such motors are generally built with internal gearing so as to impart to an output shaft some relatively slow motion of the order of one revolution or less per minute. In the present instance for a practical apparatus, the shaft may have at some means speed of the motor a rotation of, for example, one revolution in five minutes.

A fixed frequency oscillator is indicated at 46. This may be electrically identical with the oscillator 38 but will have all of its parts of fixed value so as to deliver a current at constant frequency desirably corresponding to the frequency resulting in the oscillator 38 when the contact 24 occupies a central position along the resistor 26. The current from the fixed frequency oscillator 46 is delivered through switch 47 to a second synchronous motor 48 identical with motor 44 and driving its output shaft through the same ratio of reduction gearing.

The respective shafts of the motors 44 and 48 carry arms 50 and 52 moving along resistors 56 and 58 having their terminals 60 and 62 connected to each other through a voltage source indicated as a battery 64. The arms 50 and 52 are connected at 54. The terminals 60 and 62 are additionally connected, through adjustable resistors 66 and 68 provided for the purpose of balancing the circuit, to the ends of a resistor 70 which is centrally connected at 72 to a meter 74 having additional connections to the circuit as indicated. The arrangement just described provides a Wheatstone bridge which should be so arranged as to resistances to correspond to that described in my Patent No. 2,293,403, dated August 18, 1942. If, in accordance with the disclosure of that patent, the various parts of the bridge are properly proportioned, the meter 74 will give an indication which, to a high degree of accuracy, will be proportional to the ratio of resistances introduced into the circuit between the position of the arm 50 and terminal 60 and the position of the arm 52 and terminal 62, respectively. The resistances 56 and 58 being linear in form, it will thus be evident that the meter 74 will indicate the ratio of displacements of the arms 50 and 52 from their initial positions at 60 and 62 during all operations of the apparatus, the arms 50 and 52 starting at corresponding positions. (As indicated in said patent, the arms 50 and 52 may be lifted from the resistor at the beginning of the operation to prevent short-circuit of the battery 64.)

From the foregoing, it will be seen that the system results in the indication by the meter 74 of a current value proportional to the ratio $R$. The meter, therefore, may be calibrated directly in terms of the correction term and will, over the period of operation, continuously give a reading of this term.

Desirably, some indicating means is provided to serve as a warning to the operator of the apparatus that the apparatus has reached the limit of its valid indications. Consequently, contacts 76 and 78 are arranged to be engaged by the arms 50 and 52, respectively, when they reach the ends of the resistors 56 and 58 so as to light indicating lamps 80 and 82 which may be powered by small batteries 84 and 86. When either of these lamps lights, there will thus be a warning to the operator that the range of the apparatus has been exceeded and that, consequently, the results may not be valid.

The motor 48 need not be driven by a special oscillator such as 46 if a constant frequency current is available such as the accurately controlled sixty cycle current ordinarily available. In such case the motor 48 may be driven by such current, embodying gearing of proper ratio to drive arm 52 at some mean rate of the arm 50. A mechanical clockwork may equally be used.

In the practical use of this apparatus, the arms 50 and 52 will be set in their corresponding initial positions (being, for example, frictionally carried by their shafts) with the switches 43 and 47 in open condition so that the motors 44 and 48 will not be operating although the oscillators are both operating. Suppose, for example, it is desired to take a reading of the altitude of the sun at a time, for example, in the vicinity of 4:00 P. M. Shortly before this time the navigator will clamp the movable arm 16 to the arm 4 with the movable arm in central position, i. e., with the contact 24 approximately midway of the scale 26. He will then, by moving the arm 4, bring the sun on the horizon in the sextant to secure the approximate reading corresponding to $Q_0$ of the formulae above. The arm 4 is now clamped in position and the arm 16 freed with respect thereto. The switches 43 and 47 are now immediately closed and the time of closing noted. Suppose, for example, that this is 4:01 P. M. The observer will now attempt continuously to maintain the sun on the horizon. In doing this, due to his own motions, it will be found impossible to maintain accurately the position of the sun and, consequently, the adjustments of the arm 16 seeking to accomplish this will result in moving the sun with respect to the horizon somewhat erratically. However, if a good attempt is made to maintain a fixed condition, the positive and negative fluctuations will more or less tend to cancel each other out and will substantially do so over even a short period of time. This attempt to maintain the proper setting of the instrument will be continued until some predetermined time is noted, for example 4:03 P. M., whereupon the switches 43 and 47 will be simultaneously opened. Desirably these switches are connected mechanically to a single manipulating button or the like. Upon opening of the switches the reading of the meter 74 will be noted and its reading, taking due account of proper sign, will be added to the reading of the index 6 on the scale 8. It will be evident in accordance with the foregoing that the corrected reading thus obtained will be a close approximation for the altitude of the sun at the mean time 4:02 P. M.

It will be clear that the use of the apparatus is by no means limited to the making of observations such as just described. The variation of a resistance such as that at 26 may be accomplished automatically as well as by an observer and in response to any desired variable quantity such as pressure, temperature, velocity, total flow, or the like. In any event, fluctuations in the resistance by way of deviation from some preassigned approximate value will be indicated by a meter such as 74.

The reason for having the apparatus detect deviations from an assumed value is, of course, to make it possible to keep the apparatus within reasonable bounds. It is not required to respond to the total value of the variable quantity but only to the relatively small deviations of that variable quantity from some approximation thereto. For example, if a temperature was to be measured, let us say in the vicinity of 100° C., the variations of the temperature above or below some approximate temperature in that vicinity would alone be measured by the apparatus with a consequent great improvement in the accuracy of indication.

The indication of the ratio R of Equation 6 above may be otherwise carried out. Suppose, for example, that the shafts of the synchronous motors such as 44 and 48 carry cams to produce respective movements of followers which are proportional to log $S_2$ and log $S_1$, respectively. The difference of these displacements, i. e., log $S_2$—log $S_1$, will be $$\log \frac{S_2}{S_1} = \log R$$

Figure 3:
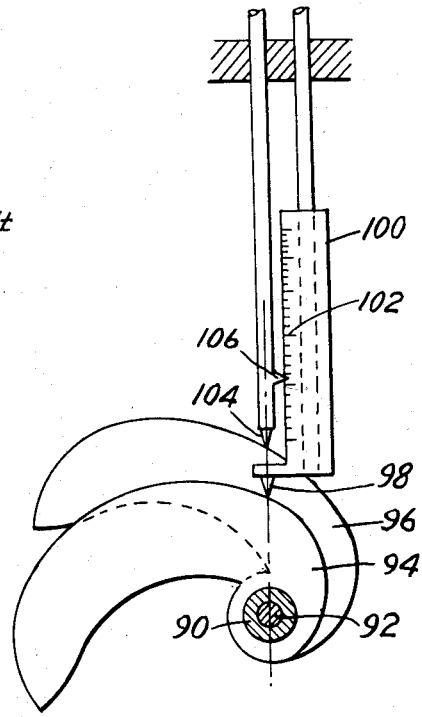
Figure 3 is a sectional diagram illustrating a modified form of indicating apparatus.

Figure 3 shows diagrammatically an apparatus operating on this principle. Shaft 90, driven by a motor running at constant speed, such as 48, carries a cam 94 shaped to impart to a follower 98 linear motion proportional to log $S_1$. Shaft 92, driven by the variable speed motor such as 44, carries a cam 96 shaped to impart to a follower 104 a linear motion proportional to log $S_2$. If to follower 98 there is secured a member 100 carrying a logarithmic scale 102 and the follower 104 carries an index pointer 106 moving along the scale, it will be evident that the scale may be calibrated so that the pointer will indicate directly $$\frac{1}{2T}\int_0^{2T} E(t) \cdot dt$$

Another method of indicating the ratio R involves the automatic construction of an angle the tangent of which is equal to $$\frac{S_2}{S_1}$$

by causing linear displacements proportional to $S_1$ and $S_2$ to occur. For example, in Figure 4, screw 110 rotated in proportion to $S_2$ moves a nut 112 carrying a vertical rod 114 sliding through a hole in a block 116. A second screw 118 rotated in proportion to $S_1$ moves a nut 120 carrying a horizontal rod 122 sliding through a hole in block 116 at right angles to the hole previously mentioned. A pin 124 extending from the block moves in a slot 126 in an arm 128 pivoted at 130. The tangent of the angle assumed by the arm with reference to the horizontal will clearly be $$\frac{S_2}{S_1} = R$$

so that a scale 132 along which the pointer 134 of the arm moves may be calibrated in terms of $$\frac{1}{2T}\int_0^{2T} E(t) \cdot dt$$

Figure 4:
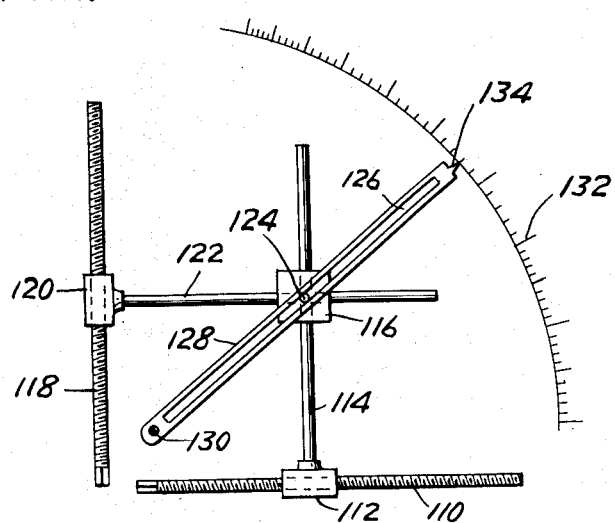
Figure 4 is a diagram showing still another type of indicating apparatus.

While the electrical type of apparatus heretofore described is simple and, therefore, preferred, the principles of the invention are not restricted thereto. It is possible, for example, to use mechanical clocks in place of the synchronous motors or clocks 44 and 48. In the case of two mechanical clocks, for example, one would operate at a constant rate and would correspond to that of the constant rate motor 48. The other would be operated at a variable rate and so correspond to the variable rate motor 44. The variation of the clock rate is readily accomplished merely by causing the normally fixed anchor for the hair spring to be varied in accordance with the deviations of the quantity to be measured. It will be evident that in such case the theoretical aspects will be identical with those heretofore discussed, and the respective clock shafts may be made either to vary resistors, as in the modification of Figure 1, to drive logarithmic cams, as in the modification of Figure 3, or to traverse carriages such as indicated in Figure 4.

Numerous other modifications of the invention will be apparent to those skilled in the art, and the invention, therefore, is not to be construed as limited beyond the restrictions in the following claims.

What I claim is:

1. Means for indicating a continuously accumulated average of a quantity varying with time comprising a pair of electrical oscillators, one of which generates a constant frequency current and the other of which generates a current having a frequency varying with the departure of the quantity being measured from a predetermined value, synchronous motors driven by said respective currents, and an electrical bridge circuit having impedances varied by said motors to provide an electrical current which is a function of the ratio of the accumulated displacements of said motors.

2. Means for indicating a continuously accumulated average of a quantity varying with time comprising a pair of electrical oscillators, one of which generates a constant frequency current and the other of which generates a current having a frequency varying substantially linearly with the departure of the quantity being measured from a predetermined value, synchronous motors driven by said respective currents, and an electrical bridge circuit having impedances varied by said motors to provide an electrical current which is a function of the ratio of the accumulated displacements of said motors.

3. Means for indicating a continuously accumulated average of a relative displacement of two members, which displacement varies with time, comprising a pair of systems each including a displaceable element, the element of one of said systems having a constant rate of displacement, and the element of the other system having a displacement the instantaneous time rate of which is controlled by, and varies substantially linearly with, the first mentioned displacement, and means for indicating the ratio of the accumulated displacements of said elements.

4. Means for indicating a continuously accumulated average of a relative displacement of two members, which displacement varies with time, comprising a system including a displaceable element, means for continuously displacing said element in one direction at an instantaneous time rate of displacement controlled by, and varying substantially linearly and continuously with, the first mentioned displacement, means for measuring time, and means controlled by the displaceable element and the means for measuring time for indicating the ratio of the accumulated displacement of said element to the elapsed time during which the accumulated displacement occurs.

5. Means for indicating a continuously accumulated average of a relative displacement of two members, which displacement varies with time, comprising a pair of oscillatory systems, one of which has a constant frequency and the other of which has a frequency controlled by, and varying substantially linearly with, said displacement, and means for indicating the ratio of the accumulated oscillations of said systems as a measure of said continuously accumulated average.

6. Means for indicating a continuously accumulated average of a relative displacement of two members, which displacement varies with time, comprising a pair of electrical oscillators, one of which generates a constant frequency current and the other of which generates a current having a frequency controlled by, and varying substantially linearly with, said displacement, synchronous motors driven by said respective currents, and means for indicating the ratio of the accumulated displacements of said motors as a measure of said continuously accumulated average.

7. Means for indicating a continuously accumulated average of a relative displacement of two members, which displacement varies with time, comprising an electrical oscillator which generates a current having a frequency controlled by, and varying substantially linearly with, said displacement, a synchronous motor driven by said current, a constant speed motor, and means for indicating the ratio of the accumulated displacements of said motors as a measure of said continuously accumulated average.

JOSEPH RAZEK.

REFERENCES CITED

The following references are of record in the file of this patent:

UNITED STATES PATENTS

| Number | Name | Date |
|---|---|---|
| 706,554 | Hall | Aug. 12, 1902 |
| 1,162,475 | Gibson | Nov. 30, 1915 |
| 1,406,235 | Smith | Feb. 14, 1922 |
| 1,746,130 | Ruhling | Feb. 4, 1930 |
| 1,857,452 | Hausman et al. | May 10, 1932 |
| 1,907,804 | Hausman et al. | May 9, 1933 |
| 1,971,238 | Silling | Aug. 21, 1934 |
| 2,117,587 | Young | May 17, 1938 |
| 2,149,756 | Arenberg et al. | Mar. 7, 1939 |
| 2,153,264 | McNeil | Apr. 4, 1939 |
| 2,176,742 | La Pierre | Oct. 17, 1939 |
| 2,337,045 | Holt | Dec. 21, 1943 |
| 2,395,042 | Flatt | Feb. 19, 1946 |
| 2,455,035 | Booe | Nov. 30, 1948 |

FOREIGN PATENTS

| Number | Country | Date |
|---|---|---|
| 668,791 | France | Nov. 6, 1929 |
| 717,529 | France | Jan. 9, 1932 |